(12) United States Patent
Massold et al.

(10) Patent No.: US 9,205,356 B2
(45) Date of Patent: Dec. 8, 2015

(54) FILTER

(71) Applicants: Andreas Massold, Balingen (DE); Frank Sommer, Balingen (DE)

(72) Inventors: Andreas Massold, Balingen (DE); Frank Sommer, Balingen (DE)

( * ) Notice: Subject to any disclaimer, the term of this patent is extended or adjusted under 35 U.S.C. 154(b) by 0 days.

(21) Appl. No.: 14/540,237

(22) Filed: Nov. 13, 2014

(65) Prior Publication Data

US 2015/0151228 A1 Jun. 4, 2015

(30) Foreign Application Priority Data

Dec. 10, 2013 (EP) .................................... 13005733

(51) Int. Cl.
*B01D 39/00* (2006.01)
*B01D 39/16* (2006.01)
*F01N 3/022* (2006.01)
*B01D 46/00* (2006.01)
*B01D 39/20* (2006.01)

(52) U.S. Cl.
CPC ........ *B01D 39/1661* (2013.01); *B01D 39/1676* (2013.01); *B01D 39/2051* (2013.01); *B01D 39/2093* (2013.01); *B01D 46/0023* (2013.01); *B01D 46/0027* (2013.01); *F01N 3/0228* (2013.01); *B01D 2239/0414* (2013.01)

(58) Field of Classification Search
CPC .... B01D 46/00; B01D 46/02; B01D 39/1676; B01D 69/06; B01D 69/08; B01D 69/10
USPC .......... 55/482, 522, 529; 96/383; 210/500.23, 210/500.29, 500.42, 500, 510, 651, 636
See application file for complete search history.

(56) References Cited

U.S. PATENT DOCUMENTS

| 3,661,267 | A | * | 5/1972 | Markley ................... 210/497.01 |
| 5,993,661 | A | | 11/1999 | Ruckenstein et al. |
| 2002/0092809 | A1 | | 7/2002 | Ries et al. |

FOREIGN PATENT DOCUMENTS

| DE | 21 16 263 A1 | 1/1972 |
| EP | 2 486 974 A1 | 8/2012 |
| WO | WO 2010081698 A1 | 7/2010 |

* cited by examiner

*Primary Examiner* — Jason M Greene
*Assistant Examiner* — Karla Hawkins
(74) *Attorney, Agent, or Firm* — Von Rohrscheidt Patents

(57) ABSTRACT

The invention relates to a filter made from an open porous solid material which is made from droplets that are arranged at one another and bonded together at contact portions through hardening, wherein open pores are provided between the droplets.

10 Claims, 1 Drawing Sheet

FILTER

RELATED APPLICATIONS

This application claims priority from and incorporates by reference European patent application 13 005 733.4 filed on Dec. 3, 2013.

FIELD OF THE INVENTION

The invention relates to a filter.

BACKGROUND OF THE INVENTION

Filters are known that are made from open pore and permeable or semi permeable solid materials which are made from a plastic granulate through sintering. Open pore means that the filter has open pores, this means cavities that are connected with one another and with an environment. The filters are thus permeable for liquids and/or gases and impermeable for solids starting with a particular particle size or semi permeable, this means for example permeable for gases and impermeable for liquids, permeable for one liquid and impermeable for another liquid and/or permeable for a solvent and impermeable for a material dissolved in the solvent.

BRIEF SUMMARY OF THE INVENTION

Thus, it is an object of the invention to provide a filter made from an open pore and permeable or semi permeable solid material which is produced differently from known filters.

The object is achieved according to the invention through a filter including an open porous permeable or semi permeable solid material, wherein the open porous solid material is made from hardened droplets which are arranged at one another and bonded together at contact portions through hardening to form the open porous solid material, wherein open pores are provided between the hardened droplets, and wherein the open pores are connected with one another and with an ambient.

The filter according to the invention includes an open pore solid material wherein the solid material is made from droplets which are hardened and bonded together at contact portions. Hardening according to the invention also includes binding, solidifying, setting or becoming harder. During hardening the droplets do not flow together or into one another completely but intermediary spaces remain between the hardened droplets which intermediary spaces are designated herein as pores. The droplets are liquid for producing the filter according to the invention and they are arranged at one another in single or plural layers so that they contact at contact points. The droplets are made from a hardening material or from a material that is hardened in the finished filter. During hardening the droplets that are arranged at one another bond together at their contact points to form open pore solid material that is included in the filter. When producing the filter according to the invention the droplets can have such low viscosity that they flow into one another at their contacts points. However, their viscosity is high enough so that they do not disintegrate completely and so that they do not flow together or into one another to form a solid body without pores. The droplets can change their shapes during hardening, however, their viscosity is high enough so that the intermediary spaces designated as pores remain between the droplets, thus open pores that are connected with one another and with the ambient.

Through open porosity the filter is permeable, this means permeable for gases and/or liquids and impermeable for solids starting with a particular particle size and optionally impermeable for liquids. The droplets of the filter can also be adjusted so that the filter is semi permeable, thus for example permeable for gases and impermeable for liquids, permeable for one liquid and impermeable for another liquid and/or permeable for one solvent and impermeable for a material dissolved in the solvent. This enumeration is exemplary and not comprehensive. The filter does not have to be rigid but it can be elastic. A size of the droplets and their flowability when producing the filter determines or influences filtering properties. By the same token the material can determine or influence the filtering properties.

An advantageous embodiment of the invention provides that the droplets include plastic material. Advantageously the droplets include a thermoplastic material which is liquefied through heating for producing the filter and which is assembled drop by drop in one layer or in plural layers. The droplets flow into each other at contact portions and bond together during cooling. A viscosity of the droplets can be adjusted through a liquification temperature. The filter according to the invention can also be made from a duroplastic material.

The droplets can have different sizes and/or can be made from different materials which yields a plethora of configuration options and a plethora of filtering properties.

An embodiment of the invention provides that the droplets that are used for producing the filter include solid particles, for example made from a plastic—metal composite, a plastic—ceramics composite or a plastics—metal—ceramics composite which is liquid for producing the filter and which hardens. For example glass particles and/or fibers made from different materials can be included in the droplets. The plastic material can remain in the finished filter as a matrix or binder or it can be removed, for example evaporated or chemically dissolved so that the solid particles for example the metal and/or ceramic particles remain and are for example sintered in order to form the open pore solid material of the filter. Also here the ability to join droplets made from different materials provides many options to configure the filter and for obtaining desired filtering properties.

This way diesel soot particle filters and catalytic converters for internal combustion engines can be produced in a rather simple manner. The solid particles can remain in droplet form when removing the plastic material so that the solid particles are provided in the finished filter in a form of droplets that are arranged at each other even when a volume is reduced when removing the plastic material and during sintering. For example through sintering the solid particles within the droplets connect with one another and the droplets bond together at contact points and open pores remain between the droplets.

An advantageous embodiment of the invention provides that the filter is an integral element of a component which is produced in one process step together with the filter, wherein in a portion which forms the filter the solid material has open pores and is permeable or semi permeable and the solid material is impermeable outside of the filter. Outside of the filter the component may be porous but not open porous, this means the pores are not continuously connected with one another and with an ambient. Advantageously the component is configured outside of the filter from solid material without pores. The solid material can be provided for example through lower viscosity droplets in a portion or portions outside of the at least one filter. Outside of the portion or the portions of the component which form the at least one filter the lower viscosity droplets flow together and into one another to form the solid material. The lower viscosity droplets can be provided by heating droplets made from the same material to a higher temperature and/or through another material.

It is also possible to dispense a material that forms the component outside the at least one portion of the component which form the at least one filter right from the beginning not in a form of droplets, but as a liquid for example also highly viscous or pasty material. Configuring the invention with the filter which is an integral element of a component which is impermeable outside of the at least one filter facilitates producing a filter in a simple manner, for example with one or plural ears, pinions, a frame or similar for handling and/or installing the filter and facilitates for example a production of a housing, a housing element, a container, etc. with a filter in one process step in one piece. A housing of this type can be for example a head light housing of a motor vehicle or of a control unit. Configuring one or plural filters facilitates ventilation wherein the filter prevents that particles move into the housing and for example damage a lamp or a reflector or precipitate on an interior of a glass which is optically undesirable.

Other applications according to the invention of the filter according to the invention can be found in medical technology, as a gas, gasoline or oil filter or water separator, as a ventilation element for barrels, barrels with chemicals, electrical toothbrushes, battery housings, in irrigation systems or desalination systems.

Another application according to the invention is using the filter as a muffler with many applications, for example in compressed air systems or pneumatic valves or for fire arms. When used as a muffler the filter function can be used or not wherein in the latter case the filter is really not a filter but merely a muffler. When implemented as a silencer for fire arms the open porous solid material according to the invention which is not really a filter in this application is advantageously tubular. Permeability or semi permeability is typically not relevant when used as a silencer for fire arms. Porosity is essential. Combustion gases of a pyrotechnical propellant of the fire arm penetrate the pores and absorb sound energy and slow down a pressure build up of the combustion gases in order to avoid or at least mitigate a pressure wave that generates a bang when the combustion gases exit from a barrel muzzle of the fire arm.

An advantageous embodiment of the invention provides that the filter is hydrophobic and/or oleophobic which are or can be important properties when the filter is used in the field of motor vehicles. In case the particles of the filter are not originally hydrophobic or oleo phobic they can be made hydrophobic or oleo phobic through additives, surface treatment or surface coating. Coating with fluro carbon compounds provides an option to make them hydrophobic or oleo phobic.

BRIEF DESCRIPTION OF THE DRAWINGS

The invention will now be described based on embodiments with reference to drawing figures, wherein.

DETAILED DESCRIPTION OF THE INVENTION

Figure 1:
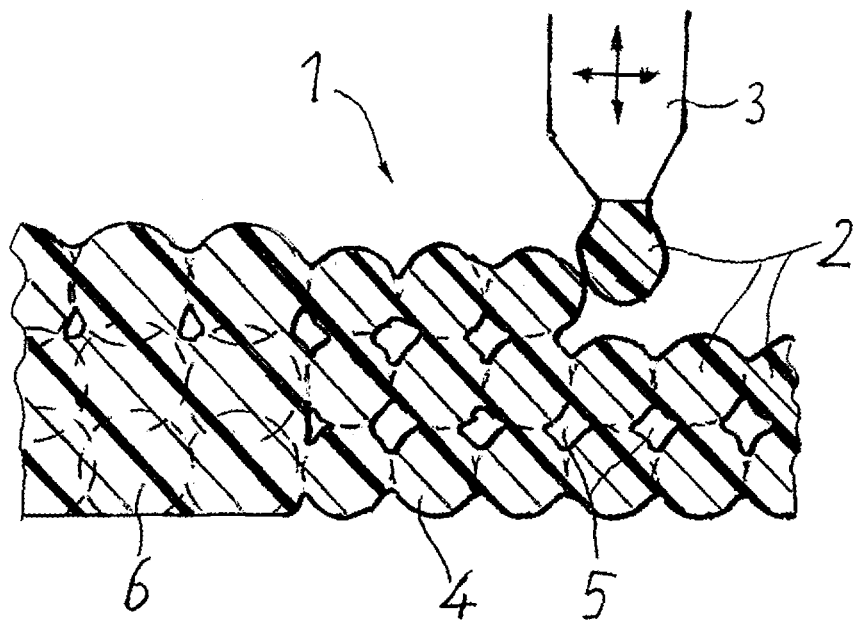
FIG. 1 illustrates a filter made from droplets made from a thermo plastic material.

The invention is subsequently described in more detail with reference to embodiments illustrated in the drawing figures. The two figures illustrate sectional views of two filters according to the invention. The drawing figure is a simplified representation used for describing the invention.

The filter according to the invention illustrated in FIG. 1 is made from droplets 2 made from a thermo plastic material in the embodiment it is made from polyethylene. Also other plastic materials are suitable besides thermo plastic materials, for example also duro plastic materials or for example also metals that have been melted through heating, this means flowable metals. Heating liquefies the thermo plastic material or makes it at least flowable enough for example pasty so that it can be put out in a form of droplets 2 through a dispensing unit 3. The droplets 2 are arranged at one another in a uniform pattern in one or plural layers. The droplets 2 flow into one another slightly at contact portions. During cool down the droplets 2 solidify which is designated here in as hardening and the droplets then bond at contact portions to form a solid material 4. In FIG. 1 the original droplets 2 are illustrated with dashed lines. During hardening the droplets 2 can flow and change their shapes. The thermo plastic material is provided with a viscosity that is high enough so that the droplets 2 do not flow apart completely during hardening and do not flow together or flow into each other to form a solid body, but the droplets 2 have a viscosity when put out that is high enough so that intermediary spaces remain between the droplets 2 after hardening wherein the intermediary spaces are designated as pores 5, thus open pores 5, thus pores 5 which are connected with one another and with the ambient.

The solid material 4 which is made from droplets 2 that are hardened and bonded together at contact portions is open porous and thus permeable, this means permeable for gases and depending on the configuration also permeable for liquids. For solids at or above a certain particle size the solid material is impermeable and thus forms the filter 1 through which for example solids can be filtered from a gas or a liquid or liquid droplets can be filtered from a gas. Also a semi permeable embodiment of the filter 1 for separating for example two liquids or a dissolved substance from a solvent is feasible.

An absolute size of the pores 5 of the filter 1 is among other things adjustable by a size of the droplets 2 through a flow capability of the droplets 2 during dispensing and a cooling speed. When the droplets 2 deform more during hardening the pores 5 become smaller.

A ratio of an entire pore volume to a volume of the solid material 4 is among other things also a function of the flowability of the droplets 2 during dispensing and the cooling speed and also depends from the arrangement of the droplets 2. For the illustrated simple arrangement of the droplets 2 at one another a packing density is smaller and thus an entire pore volume relative to a volume of the solid material 4 is greater than for an arrangement of the droplets 2 that is face centered cubic or body centered cubic. It is furthermore feasible to arrange droplets 2 with different sizes and/or droplets 2 made from different materials at one another to form the open pore solid material 4 which forms the filter 1. These considerations show that the filter properties of the filter 1 can be adjusted in many ways. A filter 1 can be produced that is suitable for dust and for fine dust and even for particles that can permeate lungs. On the other hand side a coarse filter 1 is also feasible. Also a number of layers of the particles 2 influences the filtration effect. The size of the pores 5 and the ratio of the entire pore volume to the volume of the solid material 4 defines a size of a pore surface. This is important when the material from which the filter 1 is made interacts with a gas that penetrates the filter 1 or flows through the filter 1 for example when the filter 1 is used as a catalytic converter which will be described in more detail with reference to FIG. 2.

The filter 1 is hydrophobic and when used in motor vehicles also oleo phobic. Hydro phobic and/or oleo phobic properties can be generated for example through coating the filter 1 with fluro carbon compounds.

In one embodiment the filter 1 is enveloped by a frame 6 made from solid material without pores. The frame 6 is produced in one process step together with the filter 1 and from the same material, thus in the embodiment it is also made from polyethylene. However, also another material is feasible for the frame 6, wherein the other material is dispensed with another dispensing unit or with the same dispensing unit 3 with plural material accumulators (not illustrated).

As stated supra droplets 2 made from the same material are dispensed at one another for the frame 6 and at the droplets 2 of the filter 1 and thus layer by layer the droplets 2 are dispensed being that form the frame 6 and also the filter 1. However, the droplets 2 for the frame 6 have lower viscosity during dispensing so that they flow into one another and form the frame 6 made from solid material without pores after curing. For the frame 6 more droplets 2 and/or larger droplets 2 are arranged at one another per volume because intermediary spaces between the droplets 2 have to be filled by droplets 2 flowing apart in order to form the solid material of the frame 6.

Instead of the frame 6 the solid material enveloping the filter 1 can for example also be a wall of a housing which is not illustrated in more detail and which includes one or plural filters 1 at one or plural locations. This way for example producing a head light housing for a motor vehicle with one or plural filters 1 for ventilation and air cooling is feasible. The at least one filter 1 prevents a penetration of particles into the headlight housing which would damage a lamp or a reflector and which would precipitate in an optically distracting manner on an interior of a head light glass. Like the head light housing the invention can also be implemented in other housings, containers or general components with one or plural filters 1 which are produced integrally in one piece and in one process step together with the housing, container or component.

Embodiments of the invention are control equipment housings, gasoline filters, water separators, containers with filters for medical technology applications. Instead of being used as a filter or additionally the open porous solid material 4 can be used as a silencer for example in compressed air systems and pneumatic valves or for fire arms. Further applications according to the invention are ventilation elements for barrels and chemical containers, ventilation elements for electric tooth brushes and battery housings, filters for irrigation systems, desalination plants, gas filters, oil filters, gasoline filters or water separators.

Figure 2:
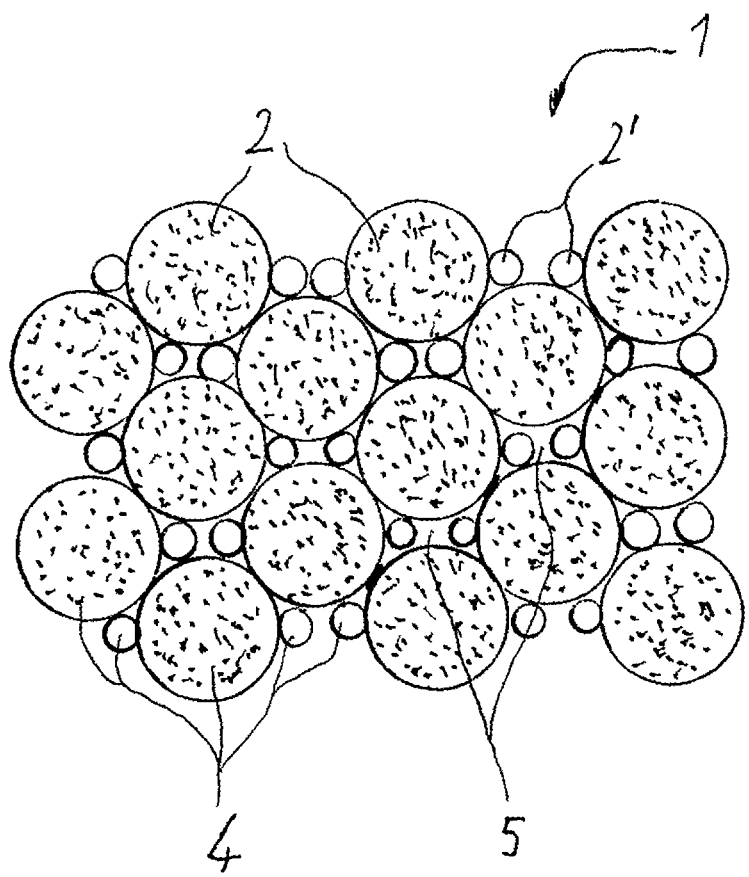
FIG. 2 illustrates a filter made from droplets made from various materials and/or with different sizes.

As apparent from FIG. 2 droplets made from various materials and/or with different sizes can be arranged at one another to form the open pore solid material 4 which forms the filter 1. In FIG. 2 small droplets 2' are arranged between large droplets 2. The small droplets 2' can be considered as spacers for the large droplets 2 which enlarge the pores 4 between the droplets 2, 2'. It is also conceivable that the large droplets 2 and the small droplets 2' perform various functions that are for example a function of their respective materials. In the embodiment the large droplets 2 are composites made from plastic material, for example polypropylene thus a thermo plastic material in which solid particles, in particular metal and/or ceramic particles are embedded. The small droplets 2' are made for example from plastic material without inclusions. The droplets 2, 2' are assembled as described supra with reference to FIG. 1 in a liquid or highly viscous or also pasty condition and bond together during hardening at contact portions to form the open porous solid material 4 that is made from two materials and/or hardened droplets 2, 2' with different sizes wherein the composite material forms the filter 1. After hardening the composite material can be removed, for example evaporated and the solid material particles can be sintered to form an open porous solid material in which the solid particles have the shape and/or arrangement of the large droplets 2. The sintering bonds the solid particles within the droplets 2 and at contact portions of the droplets 2. Using metal and/or ceramic particles facilitates producing soot particle filters or catalytic converters for internal combustion engines.

What is claimed is:

1. A filter, comprising: an open porous permeable or semi permeable solid material,
    wherein the open porous solid or semi permeable material is made from hardened droplets which are made from a droplet material and arranged at one another in a uniform pattern and bonded together at contact portions through the droplet material,
    wherein open pores are provided between the hardened droplets, and
    wherein the open pores are connected with one another and with an ambient.

2. A filter, comprising: an open porous permeable or semi permeable solid material,
    wherein the open porous solid or semi permeable material is made from hardened droplets which are made from a droplet material and arranged at one another in a uniform pattern and bonded together at contact portions through the droplet material,
    wherein open pores are provided between the hardened droplets,
wherein the open pores are connected with one another and with an ambient, and
    wherein the droplets are arranged in one or plural layers.

3. The filter according to claim 1, wherein the droplets include a plastic material.

4. The filter according to claim 1, wherein the droplets have different sizes.

5. The filter according to claim 1, wherein the droplets include solid particles.

6. The filter according to claim 1, wherein the droplets include different materials.

7. A filter, comprising:
    an open porous permeable or semi permeable solid material,
    wherein the open porous or semi permeable solid material is made from hardened droplets which are made from a droplet material and arranged at one another in a uniform pattern and bonded together at contact portions through the droplet material,
    wherein open pores are provided between the hardened droplets,
    wherein the open pores are connected with one another and with an ambient,
    wherein the droplets include solid particles, and
    wherein a plastic material is removed from the droplets and the solid particles are bonded together at contact portions through heating below a melting temperature of the solid particles to form the open porous and permeable or semi permeable solid material.

8. The filter according to claim 1, wherein the filter is an integral element of an uncut component which is produced in one process step with the filter, wherein the component is impermeable outside of the filter.

9. The filter according to claim 1, wherein the filter is hydro phobic or oleo phobic.

10. A method for absorbing sound energy, comprising the steps:
running a compressed gas through a filter; and
absorbing energy from the compressed gas in the filter, wherein the filter is configured according to claim 1.

* * * * *